March 24, 1970 J. D. BARR 3,502,804
VIDEO MONITOR INDICATING MEANS
Filed Nov. 8, 1966 3 Sheets-Sheet 1

United States Patent Office 3,502,804
Patented Mar. 24, 1970

3,502,804

VIDEO MONITOR INDICATING MEANS

John D. Barr, Oadby, England, assignor to The Rank Organisation Limited, London, England Filed Nov. 8, 1966, Ser. No. 592,874
Claims priority, application Great Britain, Nov. 8, 1965, 47,341/65
Int. Cl. H04n 3/10
U.S. Cl. 178—6.8 9 Claims

ABSTRACT OF THE DISCLOSURE

The invention is concerned with a television system having a camera and picture viewing means in which a display representative of a variable quantity is provided at the picture viewing means outside the area used for display. The variable quantity may be the setting of a control element at the television camera, for example, the zoom setting and the picture viewing means may be a picture monitor of conventional form. Means are provided for operating on a signal representative of the quantity to be indicated and producing, at the television picture viewing means, between fields, the display representative of the variable quantity and the said display may be produced during picture reception. The invention includes means for operating on said signal comprising field pulse responsive means, line pulse responsive means, timing means controlled by said field pulse responsive means and said line pulse responsive means to determine the positioning of the display representative of said quantity in relation to said area of picture display, means for producing a standard of comparison and a comparison circuit adapted to compare said signal with said standard of comparison and dependent on said signal to give an output controlled by said timing means and effective to produce said display representative of said quantity. The means for producing a standard of comparison may be a generator adapted to produce a voltage varying in periodic manner and having the same period as the line pulses and the display may represent the quantity by the length of a line or lines or by the position of a display consisting of at least one small area. The timing means may comprise gating signal generator means arranged to produce gating signals whereby the comparison circuit gives an output effective to produce said display representative of said quantity only at predetermined times.

This invention is concerned with the indication of the setting of a control element on a television camera, and is particularly, but not exclusively, concerned with the indication of zoom or focus settings, or both, of a television camera.

According to the present invention, there is provided a television system including means for producing a signal representative of the setting of a control element of a television camera, for example the zoom setting, and means for producing a signal representative of said setting for display on television display means between fields.

Preferably the information relating to said setting is displayed on a monitor or on a viewfinder, on a part of the screen above or below the picture.

An embodiment to a television system according to the present invention will now be particularly described by way of example with reference to the accompanying drawings, in which.

Figure 1:
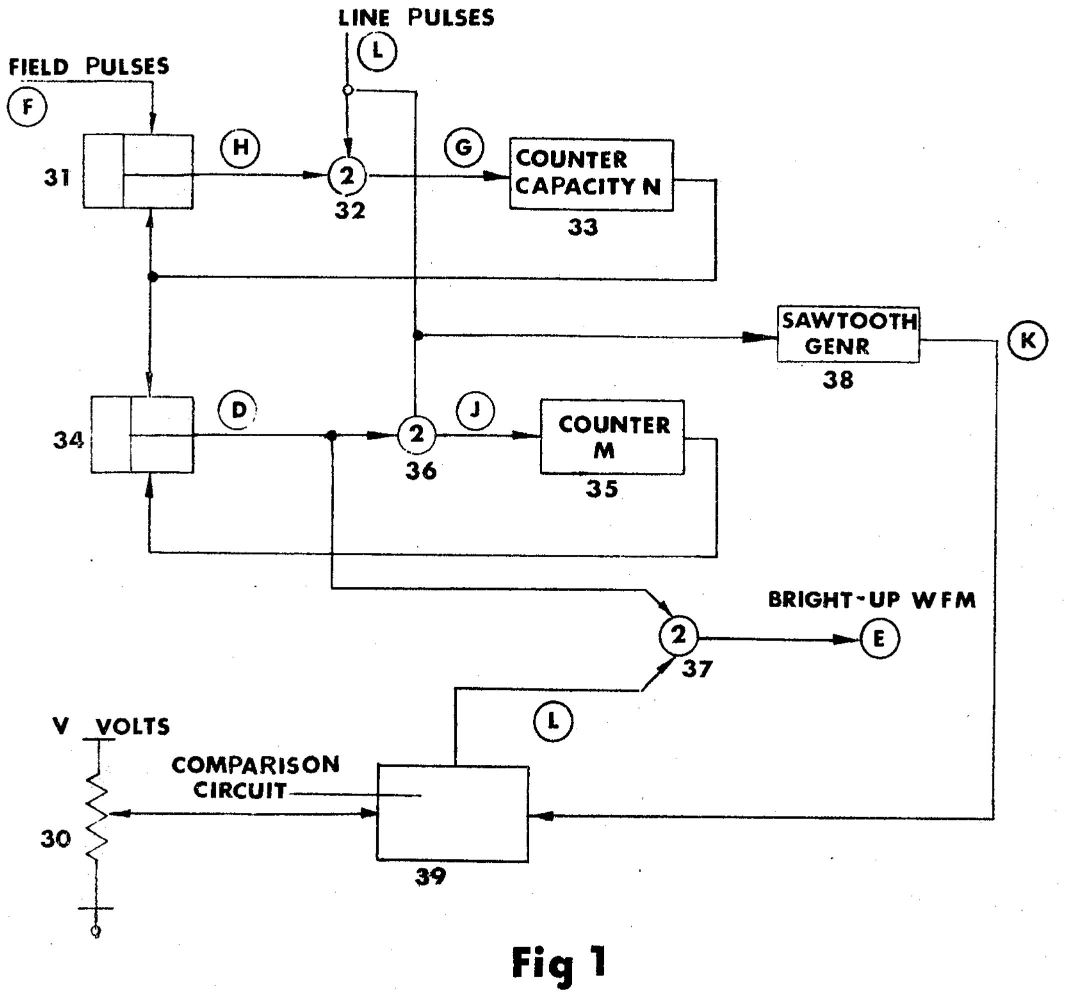
FIGURE 1 is a representation, in block diagram form, of a first embodiment of a television system.

Referring to FIGURE 1 of the drawings, a potentiometer 30 is supplied with a constant DC voltage V and is mechanically coupled to the zoom or focus mechanism, not shown, of a television system, so that its wiper provides a signal representing the zoom or focus setting of the television camera.

An incoming field synchronising pulse sets a bistable 31 which opens an "and" gate 32 thus allowing line pulses to be counted in a counter 33 with capacity N. N is chosen so that the count is not completed until sufficient time has elapsed for the field scan fly-back on the display tubes, not shown, to have settled. When N is reached, the first bistable 31 is reset as further bistable 34 is set. This second bistable 34 allows line synchronising pulses to be counted into a further counter 35 via an and gate 36. The counter 35 has a capacity M equal to the number of lines on which it is desired to display the setting.

The line pulses also trigger a sawtooth generator 38 which generates a voltage of 0 to V volts. The setting to be indicated appears on the potentiometer 30 as a voltage also in the range 0 to V volts. The two voltages are compared in a comparison circuit 39 comprising a long tailed pair, and give an output signal when the voltage representing the quantity is greater than the sawtooth voltage. This output signal is fed to an and gate 37 together with the output of the second bisable 34. The gated signal, as the output of 37 forms a "bright-up" signal which is added into any picture signal to provide a display including a bright line of length dependent on the zoom or focus setting to be indicated and thickness of M lines.

The comparison circuit can simply be a summing circuit 39 if the sawtooth generator and the potentiometer output are arranged to have opposite polarity. In this case amplification and clipping would normally be necessary.

Figure 2:
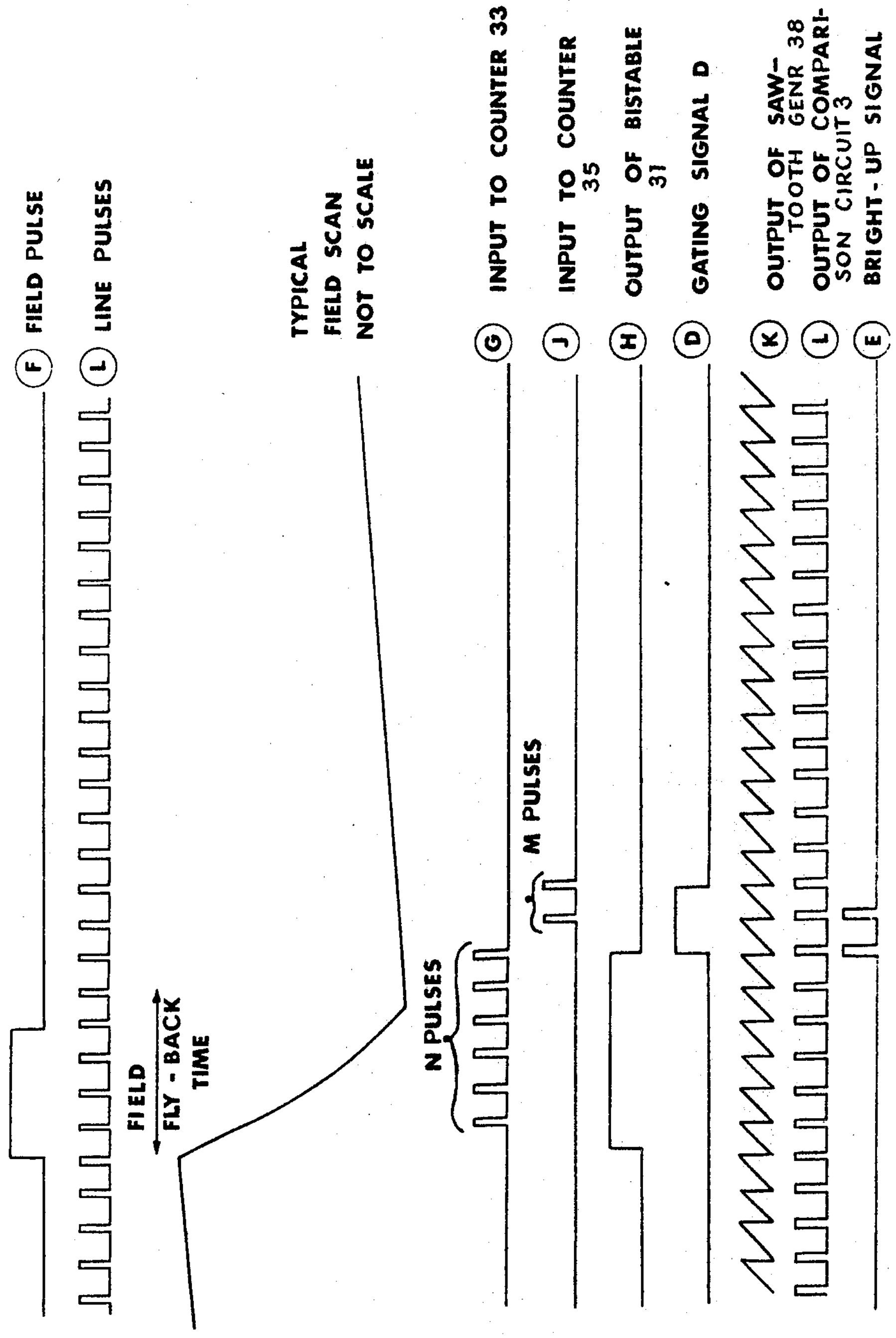
FIGURE 2 is a diagrammatic representation of the waveforms appearing at various points of the circuit shown in FIGURE 1.

Referring now to FIGURE 2 of the drawings, it will be seen that it is necessary for the field fly-back time in any monitor or viewfinder scan to be no greater than the time of N line scans. It is also necessary for $N+M$ to be no greater than the number of line scans during field suppression.

The number of lines available for display is equal to the difference between the number of line scans during field suppression and the number of line scans during field fly-back.

If enough lines are available for display, by adding another bistable, counter and comparison circuit, a further quantity can be displayed.

One quantity can be zoom setting and the other focus setting. The zoom signal is approximately linearly related to the logarithm of focal length. The focus signal is approximately linearly related to the reciprocal of object distance for sharp focus.

It will be appreciated that alternative means could be employed to achieve similar results. For example, a differentiating circuit or other means could be used to modify the waveform L or E to provide a moving spot indication rather than a variable line length indication.

One setting, for example zoom, could be represented by a line of variable length, and one by a dot of variable position, thus avoiding confusion between them.

Figure 3:
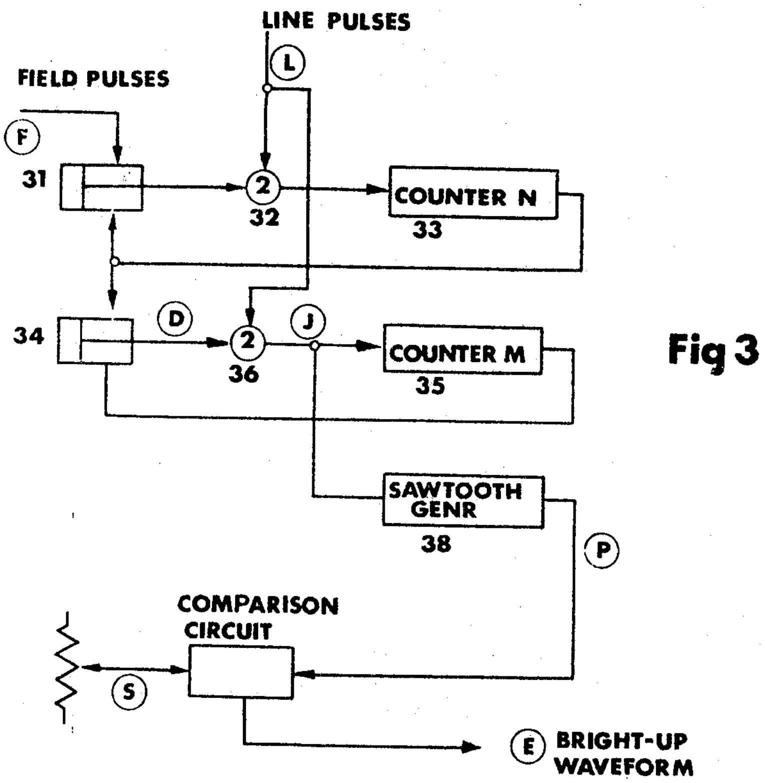
FIGURE 3 is a representation, in block diagram form, of an alternative embodiment of a television system.

In FIGURE 3 of the drawings an alternative embodiment of a television system saving one and gate 37 involves controlling the sawtooth generator 38 from the waveform J which is the output of the and gate 36. This only produces sawteeth when required.

Figure 4:
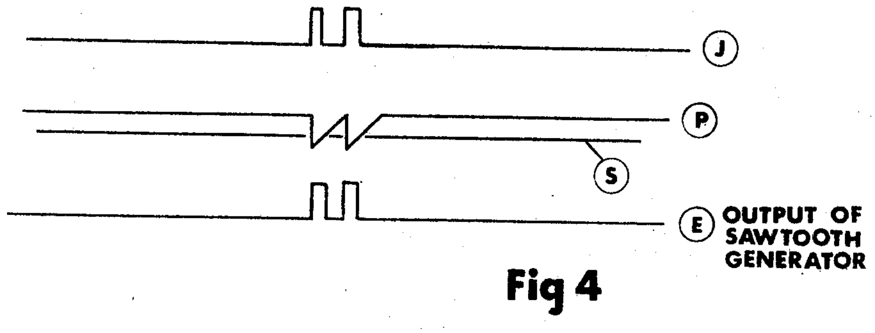
FIGURE 4 is a representation, in diagrammatic form, of the waveforms appearing at different points of the television system shown in FIGURE 3.

The corresponding waveforms appearing at points E, J, P and S of the system are shown in FIGURE 4.

I claim:

1. In a television system having a camera, a picture-viewing means with scanning means operative in response to field pulses, means adapted to produce a signal that is a function of a quantity to be indicated, and means for providing at the picture viewing means outside the area used for picture display a display representative of said quantity; the improvement comprising operating means for operating on said signal and acting between fields to produce said display, said operating means comprising field pulse responsive means, line pulse responsive means, timing means controlled by said field pulse responsive means and said line pulse responsive means to determine the positioning of the display representative of said quantity in relation to said area of picture display, means for producing a standard of comparison and a comparison circuit adapted to compare said signal with said standard of comparison and dependent on said signal to give an output controlled by said timing means and effective to produce said display representative of said quantity.

2. A television system as claimed in claim 1, in which the camera includes a device which may be set to different positions and said signal producing means is operable together with said device to produce a signal that is a function of the setting of the device.

3. A television system as claimed in claim 1, in which the means for producing a standard of comparison is a generator adapted to produce a voltage varying in periodic manner and having the same period as the line pulses and said comparison circuit, by comparing said voltage and said signal, operates to given an output in the form of at least one pulse whose duration is dependent on said signal, thereby to give a linear display whose length is indicative of said quantity.

4. A television system as claimed in claim 1, in which the means for producing a standard of comparison is a generator adapted to produce a voltage varying in periodic manner and having the same period as the line pulses, and said comparison circuit is arranged to give an output comprising short pulses and pulse shifting means are adapted to act in dependence on said signal to vary the time relationship of said pulses to the line pulses, thereby to give a display consisting of at least one small area the position of which is indicative of said quantity.

5. A television system as claimed in claim 1, in which said pulse shifting means comprises a differentiating circuit arranged to effect modification of the waveform of said short pulses.

6. A television system as claimed in claim 1, in which said timing means includes switching means arranged to be in open condition during scanning of said area used for picture display.

7. A television system as claimed in claim 1, in which said means for producing a standard of comparison is a generator adapted to produce a voltage of sawtooth form having the same period as the line pulses, and said timing means comprise gating signal generator means arranged to produce gating signals whereby the comparison circuit gives an output effective to produce said display reprentative of said quantity only at predetermined times.

8. A television system as claimed in claim 1, in which said picture viewing means has a grid for use in the production of said picture display, and switching means are provided for controlling the application of the output of said comparison circuit to said grid.

9. A television system as claimed in claim 1, in which said means for producing a standard of comparison is a generator adapted to give a voltage varying in periodic manner and having the same period as the lines pulses, and said timing means is arranged to control the operation of said generator and thereby to effect also control of the output of said comparison circuit.

References Cited

UNITED STATES PATENTS

| | | | |
|---|---|---|---|
| 2,180,944 | 11/1939 | Linsell | 178—5.8 |
| 3,435,136 | 3/1969 | Bachmann et al. | 178—6.8 |

ROBERT L. GRIFFIN, Primary Examiner

R. L. RICHARDSON, Assistant Examiner

U.S. Cl. X.R.

178—7.2, 7.92, 7.5